J. F. COOLEY.
MECHANICAL MOVEMENT.
APPLICATION FILED MAR. 21, 1908.
916,914.
Patented Mar. 30, 1909.
2 SHEETS—SHEET 1.
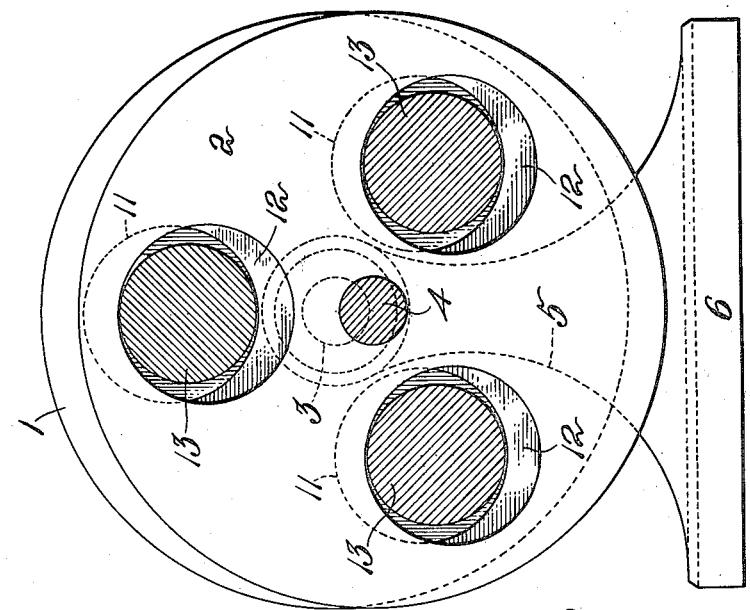
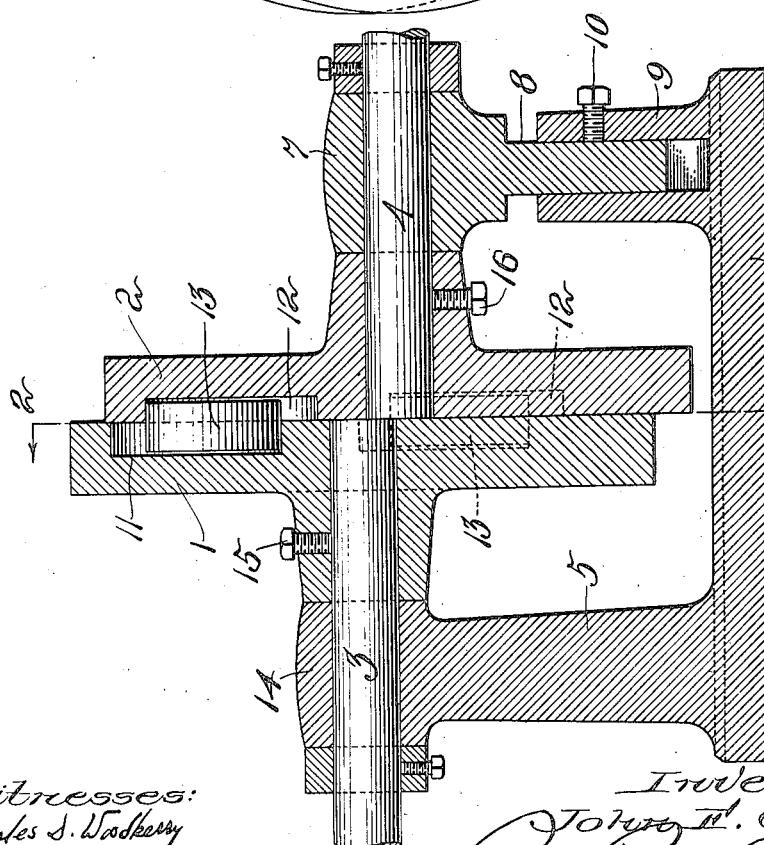
Witnesses:
Charles S. Woodberry
Josephine H. Ryan
Inventor:
John F. Cooley,
by Roberts, Roberts & Cushman,
Attorneys.

J. F. COOLEY.
MECHANICAL MOVEMENT.
APPLICATION FILED MAR. 21, 1908.
916,914.
Patented Mar. 30, 1909.
2 SHEETS—SHEET 2.
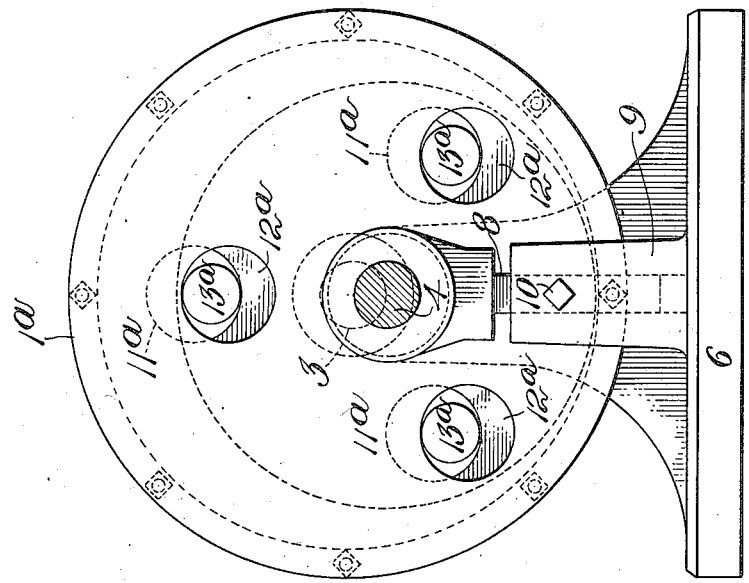
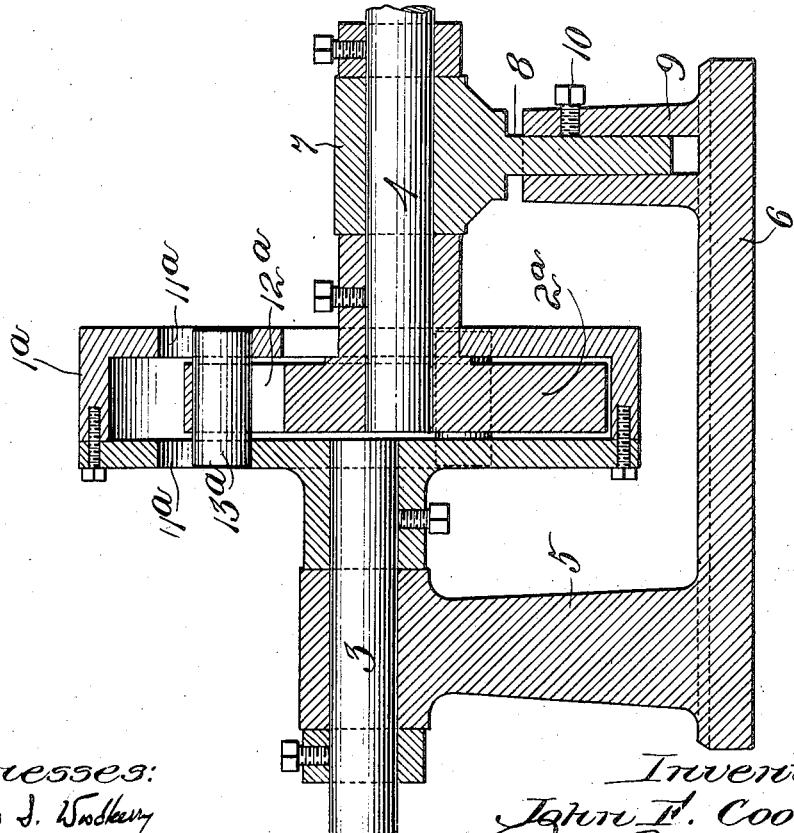
Witnesses:
Inventor:
John F. Cooley,
by Roberts, Roberts & Cushman
Attorneys.

UNITED STATES PATENT OFFICE.

JOHN F. COOLEY, OF NEW YORK, N. Y., ASSIGNOR OF ONE-HALF TO WALTER BALL, OF BOSTON, MASSACHUSETTS.

MECHANICAL MOVEMENT.

No. 916,914.　　　　Specification of Letters Patent.　　Patented March 30, 1909.

Application filed March 21, 1908. Serial No. 422,433.

*To all whom it may concern:*

Be it known that I, JOHN F. COOLEY, a citizen of the United States, and resident of New York, in the county of New York and State of New York, have invented new and useful Improvements in Mechanical Movements, of which the following is a specification.

This invention relates to a new mechanical movement by which power may be transmitted from one rotary element or shaft to another rotary element or shaft not axially in line with the first element, but offset therefrom, with little loss of power and no variation of angular velocity.

In the accompanying drawings which illustrate certain embodiments of my invention,—Figure 1 is a vertical longitudinal central section of a mechanism containing my invention; Fig. 2 is a cross section on line 2—2 of Fig. 1; Fig. 3 is a vertical longitudinal central section of a modification of my invention in which one element contains a double set of bearing surfaces and in which the rolls extend through the bearing surfaces of the other element so as to insure a balance of strains on the rolls; and Fig. 4 is an end view of the mechanism illustrated in Fig. 3.

Referring to Figs. 1 and 2 of the drawings, the reference numerals 1 and 2 represent a pair of discoid elements mounted respectively on shafts 3 and 4 which are axially offset from each other and constitute positionally fixed axes for the elements 1 and 2. Shaft 3 is mounted in a fixed bearing 14 supported by the standard 5 mounted on the base 6. Shaft 4 is mounted in the bearing 7 carried by support 8 which is adjustably mounted in the socket member 9 upon the base 6. A set screw 10 rigidly holds the shank 8 and bearing 7 in the desired position of adjustment. Each element 1 and 2, is provided with a plurality of circular bearing surfaces, the bearing surfaces of one element being distributed in radial and angular positions corresponding with the bearing surfaces of the other element. Such bearing surfaces in element 1 are illustrated at 11 and in element 2 at 12. Engaging the several bearing surfaces of the two elements are couplers, preferably in the form of rolling members, and herein shown as cylindrical rollers 13. The elements 1 and 2 are secured to shafts 3 and 4 respectively by the set screws 15 and 16.

In the modification shown in Figs. 3 and 4 the element $1^a$, corresponding in function with the element 1 above described, is provided with a pair of bearing surfaces $11^a, 11^a$, and the element $2^a$, corresponding in function with the element 2 above described, has bearing surfaces $12^a$, extending completely through the element $2^a$. The rollers $13^a$ are supported at each end by the opposed bearing surfaces $11^a$ of the element $1^a$ and extend through the bearing surfaces $12^a$ in the element $2^a$. In other respects the construction and mode of operation is substantially identical with that of the mechanism shown in Figs. 1 and 2.

The operation of the device is as follows: Rotary movement imparted to one of the rotary elements in any usual manner is transmitted to the other rotary element by means of the rollers which engage the corresponding bearing surfaces of the two elements. Referring to Figs. 2 and 4, the rollers 13, $13^a$ at the top of the drawing, are in the position least effective for causing or controlling the motion of the driven member, and the same is true of each successive roller when it reaches the point in a plane drawn through the axes of the two elements. It is therefore necessary to have a plurality of rollers and desirable to have at least three in order that one roller at least may always be in a position to drive the driven member, and one roller at least be in a position to withhold the driven element against any tendency to advance beyond the control of the driving roller which might be the case when speed changes occur. A larger number of rollers than three may be used and may be found advantageous, but satisfactory results will be obtained by using three rollers. It is not necessary that the bearing surfaces should be located at an equal angular or equal radial distance with relation to each other, provided they exactly correspond in size and location in one element with the opposed bearing surfaces in the other element. It will be noted that the rollers are engaged by the bearing surfaces at diametrically opposite points of the rolls, which points lie in a plane parallel to a plane through the axes of the two elements.

Therefore the eccentricity of the two elements may be varied to compensate for any wear or lost motion between the bearing surfaces, or different sized rollers may be used in the same bearing surfaces, thus allowing a greater or less offset between the axes of the elements as desired.

It is not necessary to the proper operation of the device that each roller and the bearing surfaces engaged thereby should be of the same size as the other rollers and their respective bearing surfaces, provided that the diameter of the several rollers must in all cases be less than the diameters of their respective bearing surfaces by an amount equal to the offset between the axes of the elements.

I claim:

1. In a mechanical movement, two rotary elements mounted on positionally fixed axes offset from each other, each element provided with a circular bearing surface such bearing surface being in the same radial position in each element, and a rigid non-yielding coupler engaging and turning within said bearing surfaces and adapted to transmit rotary movement from one of said elements to the other without change of angular velocity.

2. In a mechanical movement, two rotary elements mounted on positionally fixed axes offset from each other, each element provided with a plurality of circular bearing surfaces distributed in like radial and angular positions in each element, and rigid non-yielding couplers engaging and turning within the several corresponding bearing surfaces of the two elements and adapted to transmit rotary movement from one element to the other without change of angular velocity.

3. In a mechanical movement, two rotary elements mounted on parallel positionally fixed axes offset from each other, each element provided with a plurality of circular bearing surfaces distributed in like radial and angular positions in each element, and rollers engaging corresponding bearing surfaces of said elements in constant rolling contact therewith, said rollers being less in diameter than their respective bearing surfaces by an amount equal to said offset between the axes of said elements, whereby rotative power may be applied to one element, and transmitted to the other element through said rollers without change of angular velocity between said elements.

4. In a mechanical movement, two discoid rotary elements mounted on parallel positionally fixed axes offset from each other, each element provided with three or more circular bearing surfaces which are distributed in like radial and angular positions in each element, and cylindrical rollers engaging corresponding bearing surfaces of said elements in constant rolling contact, said rollers being less in diameter than the respective bearing surfaces by an amount equal to said offset between the axes of said elements, whereby rotative power may be applied to one element, and transmitted to the other element through said rollers without change of angular velocity between said elements.

5. In a mechanical movement, two rotary elements mounted on positionally fixed axes offset from each other, each element provided with a circular bearing surface such bearing surface being in the same radial position in each element, and a rigid non-yielding coupler engaging and turning within said bearing surfaces and adapted to transmit rotary movement from one of said elements to the other without change of angular velocity, and means for adjusting the extent of said offset between said axes and for fixing the same.

6. In a mechanical movement two discoid rotary elements mounted on parallel positionally fixed axes, one of said elements having two members embracing between them the other of said elements, said members having three or more opposed circular bearing surfaces, and the latter of said elements also having three or more circular bearing surfaces distributed in the same radial and angular positions as the bearing surfaces of the former element, and cylindrical rollers engaging corresponding bearing surfaces of said elements in constant rolling contact at their ends in the opposed bearing surfaces of the two members of the one element and at their middle portions in the bearing surfaces of the other element, said rollers being less in diameter than their respective bearing surfaces by an amount equal to said offset between the axes of said elements, whereby rotative power applied to one element will be transmitted to the other element without change of angular velocity between said elements.

7. In a mechanical movement two discoid rotary elements mounted on parallel positionally fixed axes, one of said elements having two members embracing between them the other of said elements, said members having three or more opposed circular bearing surfaces, and the latter of said elements also having three or more circular bearing surfaces distributed in the same radial and angular positions as the bearing surfaces of the former element, cylindrical rollers engaging corresponding bearing surfaces of said elements in constant rolling contact at their ends in the opposed bearing surfaces of the two members of the one element and at their middle portions in the bearing surfaces of the other element, said rollers being less in diameter than their respective bearing surfaces by an amount equal to said offset between the axes of said elements, whereby rotative power applied to one element will be transmitted to the other element without change of angular velocity between said elements, and means for adjusting the extent of said offset between said axes and for fixing the same.

Signed by me at Boston, Massachusetts, this ninth day of March, 1908.

JOHN F. COOLEY.

Witnesses:
ROBERT CUSHMAN,
CHARLES D. WOODBERRY.